United States Patent Office 3,316,303
Patented Apr. 25, 1967

3,316,303
SYNTHESIS OF HIGHER KETONES
Joseph Kern Mertzweiller, Baton Rouge, La., and Rhea N. Watts, deceased, late of St. Francisville, La., by Beulah Smith Watts, legal representative, St. Francisville, La., assignors to Esso Research and Engineering Company, a corporation of Delaware
No Drawing. Filed June 12, 1961, Ser. No. 116,618
8 Claims. (Cl. 260—593)

This invention relates to the preparation of higher ketones from lower ketones. More particularly, it relates to a process for producing higher ketones by heating a lower ketone-containing feed in liquid phase in the presence of an oil soluble metal condensation catalyst. In another embodiment of the invention, the lower ketone-containing feed is heated in a hydrogen atmosphere in the simultaneous presence of said oil-soluble condensation catalyst and a hydrogenation catalyst.

This application is a continuation-in-part of our co-pending application Ser No. 35,910, filed June 14, 1960, now abandoned.

Higher ketones are increasingly important as industrial solvents and chemical intermediates, but economic methods for their production have not been readily available. It has been known that lower ketones can be condensed to higher ketones by passing the lower ketone in the vapor phase over solid catalysts containing alkali or alkaline earth metal oxides or hydroxides at high temperatures. Liquid phase condensations of ketones are also known wherein alkali or alkaline earth metal oxides or hydroxides have been utilized as condensation catalysts. It has generally been experienced that condensations carried out in the presence of catalysts such as these are not selective in producing dimer products, but give significant amounts of other condensation products. Needless to say, this not only makes recovery of the dimer products difficult, but is wasteful of the lower ketone feeds since higher condensation products are generally of only secondary value.

It has now been found that lower ketones can be selectively condensed in the liquid phase to dimer products by carrying out the condensation reaction in the presence of an oil-soluble compound of a metal selected from the group consisting of the metals of Group II, lead, manganese and cobalt. For example, in the presence of the oil-soluble condensation catalysts of the present invention, acetone is readily condensed to give mesityl oxide with selectivities approaching 100%. Similarly, highly selective co-condensations of lower ketones with iso-aldehydes, i.e., aldehydes having only one hydrogen atom alpha to the carbonyl group, to produce unsaturated codimer ketones, are accomplished in the presence of the oil-soluble catalysts. The dimer and codimer unsaturated ketones can be selectively hydrogenated to the corresponding saturated ketones, or if desired, to the corresponding alcohols by methods well known in the art. Alternatively, in a specific embodiment of the present invention, the selective hydrogenation of the unsaturated ketones to saturated ketone can be accomplished in one step by carrying out the condensation reaction in a hydrogen atmosphere and in the simultaneous presence of the oil-soluble condensation catalyst and a hydrogenation catalyst.

Without necessarily wishing to limit the invention to any particular theory, the series of reactions involved in the present process can be illustrated as follows:

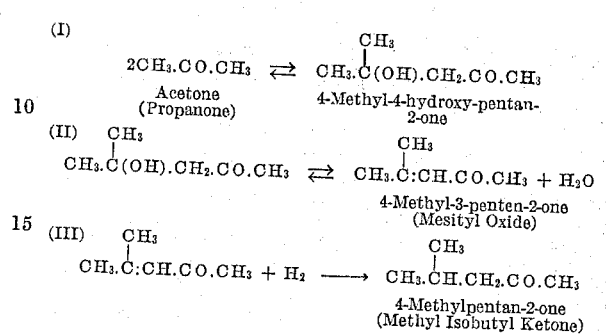

It will be understood that in the present invention the above reactions take place more or less simultaneously in the presence of catalysts as more fully described hereafter.

It will also be understood that while the equations have been written specifically for the conversion of acetone to 4-methylpentan-2-one (methyl isobutyl ketone), other ketones or mixtures of ketones with one another or with certain aldehydes can be converted similarly provided that, in the case of ketone-ketone condensations, at least one of the two ketone molecules to be condensed according to Equation (I) contains at least one hydrogen attached to a carbon adjacent to the carbonyl group; and in the case of condensations of a ketone with an aldehyde, it is essential that the aldehyde molecule to be condensed with the ketone molecule according to Equation (I) contains only a single alpha hydrogen, i.e. a single hydrogen attached to the carbon adjacent to the carbonyl group.

When mixtures of different carbonyl compounds are used as feed, it is desirable to supply them as mixtures containing approximately the same number of moles of each of the carbonyl feed compounds or, when one of the compounds is an aldehyde of the type specified, an excess of the latter may be advantageous since it has very little tendency toward autocondensation. In general, however, the relative proportions of the two feed components are not too important.

Accordingly, ketones usable in the present invention correspond to the formula

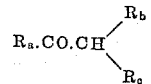

wherein $R_a + R_b + R_c$ contain a total of not more than about 12 carbon atoms and are independently selected from the group consisting of straight-chain or branched-chain alkyl groups or cycloalkyl groups, each having from one to eight carbon atoms; $R_b$ or $R_c$ or both may alternately be hydrogen atoms. Thus, acetone, methyl ethyl ketone, methyl isobutyl ketone, diethyl ketone, 5,5-dimethyl-1-ethyl-octan-3-one, 5-butyl-octan-2-one, methyl cyclohexyl ketone and the like may be used as the startg ketone. The use of symmetrical $C_3$ to $C_9$ ketones corresponding to the formula $$R.CH_2.CO.CH_2.R$$

wherein both R's are the same and are hydrogens or straight-chain alkyl radicals of 1 to 3 carbon atoms are preferred since they produce relatively high concentrations of a specific dimer ketone, whereas dimerization of unsymmetrical ketones by themselves or mixtures of ketones produces mixtures of dimeric isomers.

The aldehydes suitable for co-condensation with a ketone according to this invention can generically be classified as isoaldehydes, and can be represented by the formula $$R_1.CH.CHO$$
$$\mid$$
$$R_2$$

wherein $R_1$ and $R_2$ are straight or branched alkyl groups or cycloalkyl groups containing 1 to about 8 carbon atoms each and a sum total of about 2 to 14 carbon atoms. These aldehydes, because of their single alpha hydrogen, form completely reversible rather than stable aldols. Consequently, dimer aldehydes do not result from these reversible aldols to any appreciable extent, and the ketone-aldehyde linkage is the only one that takes place. Suitable aldehydes include 2-methyl-propanal (isobutyraldehyde), 2,5-diethyloctanal, 2-methylpentadecanal, 2-octyloctanal, etc. Aldehydes containing more than one alpha hydrogen, e.g. n-butyraldehyde, are relatively ineffective for the present purpose since the dimer aldehyde forms more readily than the aldehyde-ketone condensate. Hence, the yield of the desired higher ketone product will be nil or very small.

Thus, acetone will make methyl isobutyl ketone; diethyl ketone will make 4-methyl-5-ethylheptan-3-one; methyl ethyl ketone by itself will produce a mixture of 5-methylheptan-3-one and the isomer 3,4-dimethylhexan-2-one; a mixture of acetone and diethyl ketone will produce an isomeric mixture of 2,3-dimethyl-hexan-4-one and 3-ethylhexan-5-one; a mixture of acetone with methyl ethyl ketone will produce a mixture of the corresponding three $C_7$ ketones while a mixture of two asymmetrical ketones such as methyl ethyl ketone plus ethyl isobutyl ketone will produce a mixture of four different $C_{11}$ ketone isomers, etc. Illustrative of the co-condensation of a ketone with an aldehyde is the condensation of acetone with isobutyraldehyde which will make 2-methyl-hexan-5-one; methyl ethyl ketone plus 2-ethyl butanal will make a mixture of 5-methyl-3-ethylheptan-6-one and 3-ethyloctan-6-one; and so forth.

The condensation catalysts of the present invention include the oil-soluble compounds or complexes of metals of Group II of the Periodic Table, lead, manganese and cobalt. The oil-soluble salts of lead, cobalt, manganese, beryllium, magnesium, calcium, zinc, barium and strontium are particularly suitable in the present process. Of the various oil-soluble compounds of these metals, the $C_6$ to $C_{20}$ fatty acid soaps are preferred, e.g. metal salts of acids such as hexanoic, octanoic, decanoic, lauric, stearic, oleic, naphthenic, linoleic, and tall oil acids. Complexes of the metals with diketones such as acetylacetone, or the alcoholates of the higher fatty alcohols, such as decyl, tridecyl, and the like, are also suitable. The oil-soluble compounds of magnesium, particularly the magnesium soaps, e.g. the oleate, stearate, naphthenate and tallate, are especially preferred as condensation catalysts in the present process.

The amount of condensation catalyst employed will generally be between 0.1 and 1 wt. percent, calculated as metal on the ketone-containing fuel. Lower amounts are generally not satisfactory in achieving a desirable rate of reaction, while greater amounts, except in the case of the very heavy metals, e.g. barium and lead, appear to have no substantial advantageous affect. With the heavy metal compounds, up to 3 wt. percent of the catalyst may be used.

The condensation reaction is carried out at a temperature generally between about 200° and 500° F., the preferred temperature being in the range of 300° F. to 450° F. Any suitable system which provides good mixing and which will maintain the feed essentially in the liquid phase at reaction temperatures is satisfactory, e.g. a stirred autoclave. Reaction times will vary depending upon the nature of the feed material and generally will range between about five minutes to two hours.

The crude product from the condensation reaction comprises a mixture of unreacted feed and the unsaturated dimer ketone condensation product. The unreacted product is preferably separated from the condensation product by distillation or other suitable means, and recycled to the condensation reactor. The dimer ketone condensation product is then passed to a hydrogenation system wherein it is selectively hydrogenated to the corresponding saturated ketone, or if desired, to the corresponding secondary alcohol.

While the present invention in its broadest aspects comprises the condensation of ketone-containing feeds in the presence of soluble compounds of certain metals which serve as condensation catalysts as mentioned hereinabove, a more specific embodiment comprises carrying out the condensation reaction in the additional presence of a hydrogenation catalyst and under hydrogenation conditions, e.g. under a hydrogen-containing atmosphere. By condensing the lower ketone-containing feed under such conditions, the unsaturated higher ketone condensation product is converted concurrently to the corresponding saturated ketone in a single process step. The hydrogenation catalyst, of course, must not be poisoned by the condensation catalyst, nor must it hydrogenate the carbonyl function very readily, i.e., it must favor the selective hydrogenation of the carbon-carbon unsaturation of the ketone condensation product.

Two kinds of hydrogenation systems have been found satisfactory. Preferred is the homogeneous type of hydrogenation which is characteristic of cobalt hydrocarbonyl in solution. If this system is to be used, a soluble form of cobalt is added with the condensation catalyst and sufficient carbon monoxide and hydrogen partial pressures must be used to maintain a sufficient concentration of the hydrocarbonyl. Of course, desirably at least one mole of hydrogen is supplied to the reaction per two moles of carbonyl feed. Preferably the hydrogen is supplied in 50 to 300% stoichiometric excess over that consumed in the reaction. High total pressures shift the reaction equilibrium toward formation of the desired higher ketone. On the other hand, unduly high hydrogen partial pressures tend to cause excessive alcohol formation. This is an additional reason why it may be desirable to dilute the hydrogen with carbon monoxide, and additionally, even with the inert gas such as nitrogen. Carbon monoxide partial pressures in the range of 200–1200 p.s.i.a., and hydrogen partial pressures in the range of 500–2000 p.s.i.a., are generally used at temperatures in the range of 200° to 450° F., preferably 250° to 375° F. The higher the temperature, the higher the CO partial pressure required to maintain catalyst stability. The hydrogenation activity of such a system is proportional to the cobalt concentration which is generally maintained in the range of 0.1 to 5.0%, preferably 0.5 to 1% based on ketone-aldehyde feed. The optimum concentration of hydrogenation catalyst, of course, depends somewhat on the particular feed, the hydrogen partial pressure, reaction temperature and particular form of catalyst system employed, but is readily determined by routine tests. As in the case of the condensation catalyst mentioned above, the cobalt is also preferably added in soluble form, e.g. as a salt of the carboxylic acids mentioned earlier herein or as dicobalt octacarbonyl, etc. For the purpose of providing cobalt to act as a hydrogenation catalyst, a water-soluble cobalt salt dissolved in a small amount of water is also suitable, since the water-soluble salt is converted under reaction conditions to the oil-soluble cobalt carbonyl.

When the cobalt catalyst system is used, it is advisable to remove the cobalt compounds prior to distillation of the final product. This is conveniently done according to procedures common in the treatment of products from the well-known oxo process for the preparation of aldehydes by carbonylation of olefins. For instance, the cobalt compounds can be removed by extraction with aqueous acid or other aqueous acidic solution, from which the metallic components may be recovered and recycled. When water-soluble products are present, it is more convenient to demetallize the crude reaction product by thermally decomposing the cobalt hydrocarbonyl and carbonyl in a hydrogen atmosphere to metallic cobalt, in which case most of the zinc or other condensation catalyst will remain in solution and can be recovered and recycled from the subsequent distillation of the products. The demetallized crude product is then distilled to separate the higher ketone from unreacted carbonyl feed compounds which may also be recycled to the process.

A second hydrogenation system which works well in this process employs the sulfides of nickel, tungsten or molybdenum, preferably deposited on a carrier such as activated carbon. These catalysts are not poisoned by the oil-soluble condensation catalysts and are not unduly active for hydrogenation of the carbonyl group in the monomeric or dimeric ketones, especially when operating in the preferred temperature range of 250°–375° F. and at relatively low hydrogen partial pressures. To use this hydrogenation system the reactor is simply packed with the supported catalyst and the zinc is added in soluble form as described previously. Of course, no cobalt or carbon monoxide or any other diluent gas need be used except as a means of increasing total pressure and thus facilitating the main condensation reaction. Hydrogen partial pressures are in the range of 200–1000 p.s.i.a. The hydrogen is generally added in 50–300% stoichiometric excess over that consumed in the reaction. In any case, the reaction mixture is desirably maintained under reaction conditions until at least 30% to 60% or more of the ketone feed is converted.

When the production of higher alcohols rather than of ketones is desired, relatively severe hydrogenation conditions may be purposely chosen.

In the embodiment which makes use of a homogeneous hydrogenation catalyst, it is necessary to maintain good contact between the gaseous and liquid phases either by mechanical agitation, by circulation of the gas or liquid, or by other known means. In the embodiment which makes use of a heterogeneous hydrogenation catalyst, it is necessary to maintain good contact between the gaseous, liquid and solid phases.

Aside from the advantage of carrying out the condensation, dehydration and hydrogenation operations in a single processing step, there is another unique advantage in that two exothermic reactions (condensation and hydrogenation) are balanced against the endothermic dehydration reaction. Thus, the heat liberated by one set of reactions is largely consumed in another reaction with the overall result that temperature control is facilitated and process economies are achieved.

The operation and advantages of the invention are illustrated by the following examples.

EXAMPLE I

Acetone in liquid phase was heated in a stirred autoclave at a temperature of about 225° C. (437° F.) for periods of one to two hours in the presence of the condensation catalyst. The condensation product was then analyzed by the vapor chromatographic technique to obtain the data shown in the following table. The traces of by-products were mainly heavier materials, phorone, isophorone, etc.

TABLE I

| Catalyst | Wt. Percent Metal | Time, Hrs. | Wt. Percent Conv. | Wt. Percent Selec.* |
|---|---|---|---|---|
| Co Acetyl-acetonate | 0.2 | 1 | | 95– |
| Do | 0.2 | 2 | 8 | 95– |
| Zn Decanoate | 0.4 | 2 | 10 | 90 |
| Do | 0.6 | 2 | 11 | 90 |
| Mg Stearate | 0.2 | 1 | 15 | 95+ |
| Do | 0.2 | 2 | 10 | 95+ |
| Do | 0.4 | 2 | 11 | 95+ |
| Mg Oleate | 0.4 | 2 | 13 | 95+ |
| Ca Octoate | 0.8 | 1 | 13 | 95+ |
| Ba Stearate | 1.7 | 1 | 6 | 95+ |
| | | 2 | 15 | 95+ |
| Pb Naphthenate | 2.6 | 1 | 15 | |
| | | 2 | 10 | |
| Mn Naphthenate | 0.7 | 1 | 17 | 95+ |
| | | 2 | 16 | 95+ |
| Mg Oxide | 2.0 | 2 | 16 | 95+ |
| Zn Oxide | 2.0 | 2 | <1 | |
| | | | <1 | |

*To mesityl oxide.

It will be observed that very high selectivities to the desired dimer ketone are obtained with the oil-soluble catalysts of the present invention. In contrast, the insoluble magnesium oxide and zinc oxide were ineffective as condensation catalysts even when employed in much higher amounts than the soluble catalysts of the corresponding metals.

EXAMPLE II

Acetone and isobutyraldehyde in liquid phase in a molar ratio of 2:1 were heated with 0.2 wt. percent, calculated as metal, of the oil-soluble condensation catalyst in an agitated autoclave. The condensation products were analyzed by vapor chromatography to obtain the selectivity data given in the following table:

TABLE II

| Catalyst | Temp., °C. | Mol Ratio, Acetone/i-C$_4$ Ald. | Time, Min. | i-C$_4$ Ald. Conv. | Selectivity* to Codimer |
|---|---|---|---|---|---|
| Mg Stearate | 175 | 1 | 15 | 31 | 77 |
| Do | 175 | 2 | 15 | 50 | 81 |
| | | | 30 | 58 | 75 |
| Mg Oleate | 175 | 2 | 25 | 55 | 82 |
| Do | 200 | 2 | 15 | 53 | 85 |
| Co Octoate | 200 | 2 | 15 | 45 | 85 |
| Ca Stearate | 200 | 2 | 15 | 49 | 87 |
| Mn Acetyl-acetonate | 200 | 2 | 15 | 47 | 83 |

*To 5-methyl-3-hexene-2-one.

These data again illustrate the high selectivity to codimer product provided by the oil-soluble catalysts of the invention.

EXAMPLE III

This example illustrates the condensation of a ketone with a higher molecular weight aldehyde. Acetone (58 gms.) and 2 ethyl hexaldehyde (64 gms.) were treated wtih 0.24 wt. percent magnesium as magnesium oleate at a temperature of 392° F. Analytical results of 30 to 60 minutes reaction time are shown below:

| Concentration, Wt. Percent | 30 Min. | 60 Min. |
|---|---|---|
| Acetone | 43 | 38 |
| 2 ethyl hexaldehyde | 33 | 25 |
| Intermediate | 1 | 2 |
| C$_{11}$ Unsat. Ketone | 18 | 27 |
| Heavier products | 5 | 8 |
| Conv. of 2 ethyl hexaldehyde | 28 | 46 |
| Select. to C$_{11}$ Unsat. Ketone | 78 | 77 |

The following examples serve to illustrate that embodiment of the invention wherein the condensation reaction conducted in the additional presence of a hydrogenation catalyst under hydrogenation conditions.

EXAMPLE IV

Run No. 1

In a typical run one liter of acetone, 0.8% on acetone cobalt (as dicobalt octacarbonyl) and 0.4% on acetone zinc (as zinc decanoate) were charged to a three-liter shaker autoclave. The contents were purged with synthesis gas (1.4/1 $H_2$/CO mole ratio) and heated to 375° under a pressure of 3000 p.s.i.g. synthesis gas. Heating and shaking were continued for three hours. The contents were cooled, depressured, then repressured to 1000 p.s.i.g. with hydrogen and heated at 350° F. for 70 hours to precipitate cobalt from the reaction mixture. The autoclave was cooled, depressured and discharged. The liquid product was filtered to remove the bulk of the cobalt which had precipitated. The product was fractionated into three main fractions as follows:

| Fraction | Boiling Range, °F. | Volume Percent |
|---|---|---|
| A | 130–140 | 32 |
| 1. Azeotrope with $H_2O$ | 189–190 | 50 |
| 2. After water was removed | 230–250 |  |
| C | 250+ Bottoms | 18 |

Fraction A was predominantly acetone. Vapor chromatographic analysis of fraction B showed 13% acetone, 71% methyl isobutyl ketone (MIBK) and 16% water. The bottoms (fraction C) contained the catalyst residues, mostly zinc decanoate, and some unidentified by-products. The overall results calculated as follows:

|  | Percent |
|---|---|
| Conversion of acetone | 61.5 |
| Yield of MIBK | 35.5 |
| Selectivity to MIBK | 67 |

Run No. 2

A run similar in all respects to Run No. 1 except that 0.4% on acetone of cobalt (as dicobalt octacarbonyl) and 0.2% on acetone of zinc (as decanoate) was used as catalyst gave only 31% conversion of the acetone, and the major portion of the product boiling above acetone was 4-methyl-3-penten-2-one (mesityl oxide), an MIBK precursor rather than MIBK itself. It is thus evident that these conditions were less than optimum for the desired condensation reaction and not very effective for the desired hydrogenation of the dehydrated condensation product. In the absence of sufficiently effective hydrogenation conditions, high yields of desired product cannot be obtained due to the reversible nature of the condensation and dehydration reactions (see Equations I and II earlier herein). However, it will be understood that while different feeds and catalysts will require somewhat different reaction conditions and catalyst concentrations for achieving effective hydrogenation, an appropriate reaction system can be established for each case by essentially routine preliminary tests. This is further illustrated in subsequent runs 4–6 wherein an effective system was established under conditions similar to run 2 by the simple expedient of extending the residence time.

EXAMPLE V

The following series of runs further illustrates the conversion of acetone to methyl isobutyl ketone using a soluble zinc catalyst and cobalt hydrocarbonyl as the hydrogenation medium.

| Run No. | 3 | 4 | 5 | 6 |
|---|---|---|---|---|
| Feed | Acetone | | | |
| Zn Conc., wt. percent | 0 | 0.2 | 0.4 | 0.4 |
| Zn, added as | | Decanoate Salt | | |
| Cobalt Conc., wt. percent | 0.2 | 0.2 | 0.4 | 0.4 |
| Co, added as | $Co_2(CO)_8$ | | | Oleate |
| Average Temperature, °F | 375 | 375 | 350 | 350 |
| Time, hrs | 6 | 6 | 12 | 6 |
| Gas Medium, mole ratio | Synthesis Gas ($H_2$/CO 1.4/1) | | | |
| Pressure, p.s.i.g | 3,000 | | | |
| Demetallization | 2 hrs. at 350° F. and 1,000 p.s.i.g. $H_2$ | | | |
| Acetone Converted, percent | 14 | 62 | 60 | 44 |
| MIBK Yield, percent | 8 | 36 | 31 | 23 |
| Selectivity percent, to MIBK | 67 | 68 | 61 | 61 |

Run No. 3 shows that in the absence of any condensation catalyst the yield of the dimeric ketone is very low. Comparison of Runs 4–6 with Run 2 of Example III shows that even at low catalyst concentrations an effective reaction can be obtained provided that the residence time is long enough. Longer reaction times can also be used to compensate for lower reaction temperatures and vice versa, as shown by comparison Run 4 with Runs 5 and 6.

EXAMPLE VI

The invention is also effective with a heterogeneous hydrogenation catalyst such as molybdenum sulfide on a charcoal support. This is illustrated by the following run, using the same autoclave as before.

Charge:
    Acetone _____grams__ 790
    Zinc decanoate dissolved in butanol
      (0.4 wt. percent on acetone) _____do____ 50
    Molybdenum sulfide on charcoal
      (Catalyst No. 1167)_____cc__ 500

Conditions:
    Gas _____ Hydrogen
    Pressure _____p.s.i.g__ 1000
    Temperature, °F. _____ 400
    Time _____hours__ 8

*Product distribution*

|  | Volume percent |
|---|---|
| Acetone | 36.60 |
| Isopropanol | 43.93 |
| MIBK | 5.42 |
| Mesityl oxide | 0.19 |
| 4-Me-2-pentanol | 1.49 |
| Mesitylene | 0.04 |
| Phorone | None |
| Isophorone | None |
| Heavy bottoms (incl. catalyst+carrier) | 12.33 |
| Total | 100.00 |

As indicated by the high yield of isopropanol, the conditions employed were unnecessarily severe. Better selectivity to MIBK can be obtained with shorter holding times and lower temperatures and lower hydrogen partial pressures, e.g. by operating for six hours at 350° F. and a hydrogen partial pressure of 600 p.s.i.g. Dilution with nitrogen to increase the total pressure, preferably to 1500 to 3000 p.s.i.g., can be beneficial.

EXAMPLE VII

This example illustrates the preparation of a higher ketone by condensation of a lower ketone with an aldehyde, specifically the condensation of acetone and isobutyraldehyde to give methyl isoamyl ketone (MIAK).

Charge:
    Isobutyraldehyde (500 g.) _____cc__ 575
    Acetone (378 g.) _____cc__ 465
    Cobalt oleate dissolved in $C_7$ olefins Charge:—Continued
(153 g.) _____ cc__ 180
Zinc decanoate dissolved in C₇ olefin
(50 g.) _____ cc__ 46

Reaction conditions:
  Gas _____ Synthesis gas (H₂/CO 1.4/1).
  Pressure _____ 3000 p.s.i.g.
  Temperature _____ ° F. 375.
  Time _____ 3 hours.

Decobalter conditions:
  Pressure _____ H₂ 1000 p.s.i.g.
  Time _____ 2 hours.
  Temperature _____ ° F. 350.

PRODUCT DISTRIBUTION
[Vol. percent (by distillation only)]

| | Component | Boiling Range, ° F. |
|---|---|---|
| Acetone | 14 | 134–138. |
| MIAK | 24 | 138 at 20 mm.–290° F. (atmos.). |
| Bottoms (incl. cat.) | 62 | 138° F. + at 20 mm. |
| Catalyst | 9 | |

The MIAK cut had a refractive index of 1.400 which corresponds to a purity of about 90% methyl isoamyl ketone.

Another run was carried out under substantially the same conditions except that n-butyraldehyde was substituted in the feed for isobutyraldehyde, and the mixture was held at reaction conditions for 12 hours. Substantial amounts of 2-ethylhexenal, 2-ethyl isohexaldehyde and heavier compounds were found in the product mixture, but methyl n-amyl ketone (which would result from a condensation of acetone with n-butyraldehyde) could not be identified in the product. This illustrates that aldehydes having more than one alpha hydrogen are not suitable for the present invention.

EXAMPLE VIII

An alternative preparation of methyl isoamyl ketone is shown below, using a heterogeneous hydrogenation system.

Charge:
  Isobutyraldehyde (570 g.) _____ cc__ 720
  Acetone (458 g.) _____ cc__ 580
  Zinc decanoate (50 g.) _____ cc__ 46
  Molybdenum sulfide on char (prepared by depositing molybdenum oxide on charcoal pellets and sulfiding with H₂S before use) ___cc__ 500

Conditions:
  Flushed with H₂
  Bled gas off to zero gage pressure
  Heated up to 400° F. (pressure was 400 p.s.i.g.)
  Added 200 p.s.i.g. H₂
  Treated for 12 hours at 400° F.
  Kept total bomb pressure at 600 p.s.i.g. by intermittent addition of H₂.

*Composition of product*

Chromatographic analysis                          Percent
  Acetone _____ 20.0
  Isopropanol _____ 8.0
  MIBK _____ 1.3
  Mesityl oxide _____ 0.07
  MIAK _____ 21.42
  Unknown _____ 9.3
  Mesitylene _____ 0.04
  Phorone _____ 3.24
  Isophorone _____ 7.14
  Unknown (phorone-like) _____ 15.07

Selectivity to methyl isoamyl ketone can be further improved by changes in operating conditions, e.g., providing a shorter holding time, lower temperature, lower hydrogen partial pressure, increased total pressure (by dilution with nitrogen or the like), or by an appropriate combination of any two or more of these variables.

Unless otherwise indicated, all proportions and percentages of materials are expressed herein on a weight basis.

Having described the general nature and operating conditions of the invention, as well as detailed illustrative examples thereof, it will be understood that these are not intended to limit the scope of the invention except as specifically recited in the appended claims.

What is claimed is:

1. A process for making a higher ketone from a lower ketone corresponding to the formula

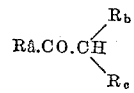

wherein $R_a$, $R_b$ and $R_c$ are radicals which together contain from 1 to 12 carbon atoms, $R_a$ being a radical selected from the group consisting of alkyl and cycloalkyl radicals of 1 to 12 carbon atoms, and $R_b$ and $R_c$ being independently selected from the group consisting of hydrogen atoms, alkyl radicals and cycloalkyl radicals having from 1 to 8 carbon atoms, which process comprises heating said lower ketone in the liquid phase in an enclosed zone in the simultaneous presence of (a) an oil-soluble condensation catalyst containing a metal selected from the group consisting of zinc, calcium, barium, lead, manganese and cobalt, and (b) a hydrogenation catalyst selected from the group consisting of sulfides of molybdenum, nickel and tungsten and a cobalt carbonylation catalyst, under effective hydrogenation conditions including a reaction temperature between about 200° and 450° F. and a hydrogen partial pressure between about 200 and 2000 p.s.i.a., recovering the resulting liquid reaction mixture, and separating from said mixture a higher ketone containing as many carbon atoms per molecule as two molecules of said lower ketone.

2. A process according to claim 1 wherein said lower ketone consists essentially of a symmetrical ketone having from 3 to 9 carbon atoms per molecule.

3. A process according to claim 1 wherein said lower ketone is diethyl ketone.

4. A process according to claim 1 wherein said hydrogenation catalyst comprises a cobalt carbonylation catalyst and wherein the hydrogenation conditions include a partial pressure of carbon monoxide in the range of 200 to 1200 p.s.i.

5. A process for making methyl isobutyl ketone which comprises heating acetone in the liquid phase in an enclosed reaction zone in the presence of 0.2 to 5% of cobalt and 0.1 to 1% of zinc, each based on the acetone and each being supplied to the reaction zone in an oil-soluble form, under effective hydrogenation conditions including a reaction temperature between about 250° F. and 375° F., a hydrogen partial pressure of 500 to 2000 p.s.i., a carbon monoxide partial pressure of 200 to 1200 p.s.i., and sufficient residence time to permit the conversion of at least 30% of acetone to higher boiling products, and separating methyl isobutyl ketone from the resulting reaction mixture.

6. A process according to claim 5 wherein hydrogen and carbon monoxide are supplied to the reaction zone in a mole ratio of 1 to 5 moles of hydrogen per mole of carbon monoxide, hydrogen being supplied in an amount representing an excess of 50 to 300% over the stoichiometric amount.

7. A process according to claim 5 wherein the resulting reaction mixture is heated in an atmosphere substantially free of carbon monoxide so as to decompose soluble cobalt carbonyl compounds present in said mixture, and only then is the resulting decobalted mixture distilled separate acetone and methyl isobutyl ketone therefrom.

8. A process according to claim 5 wherein the resulting reaction mixture is extracted with acetic acid so as to remove metal compounds therefrom before methyl isobutyl ketone is recovered therefrom.

References Cited by the Examiner
UNITED STATES PATENTS

| | | | |
|---|---|---|---|
| 2,245,567 | 6/1941 | Brant et al. | 260—593 |
| 2,245,582 | 6/1941 | Gallagher et al. | 260—601 |
| 2,499,172 | 2/1950 | Smith | 260—593 |
| 2,820,067 | 1/1958 | Mertzweiller et al. | |
| 2,982,784 | 5/1961 | Reck et al. | 260—601 |
| 3,060,236 | 10/1962 | Kollar et al. | 260—593 X |

LEON ZITVER, *Primary Examiner.*

LORRAINE A. WEINBERGER, D. D. HORWITZ,
*Assistant Examiners.*